No. 813,174. PATENTED FEB. 20, 1906.
C. REINHART.
FORGING AND WELDING MACHINE.
APPLICATION FILED APR. 1, 1905.
2 SHEETS—SHEET 1.
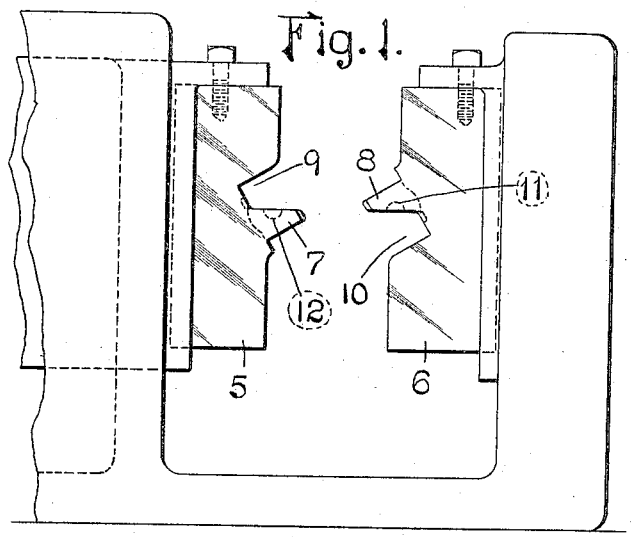
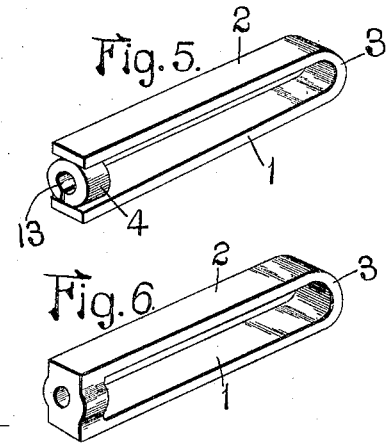
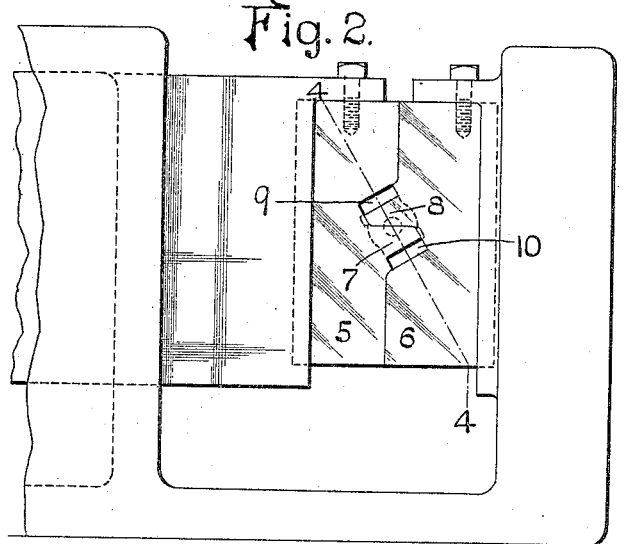
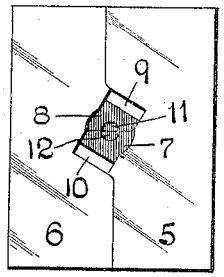
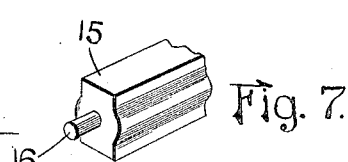
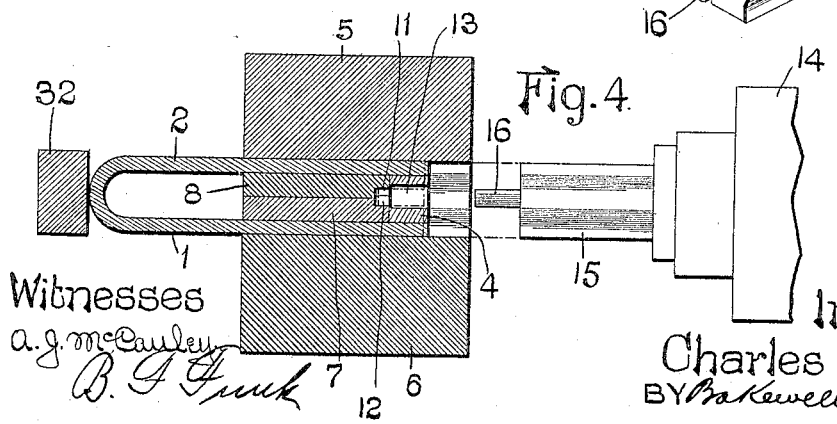
Witnesses
a. J. McCauley
B. J. Funk
Inventor:-
Charles Reinhart
BY Bakewell Cornwall
ATT'YS.

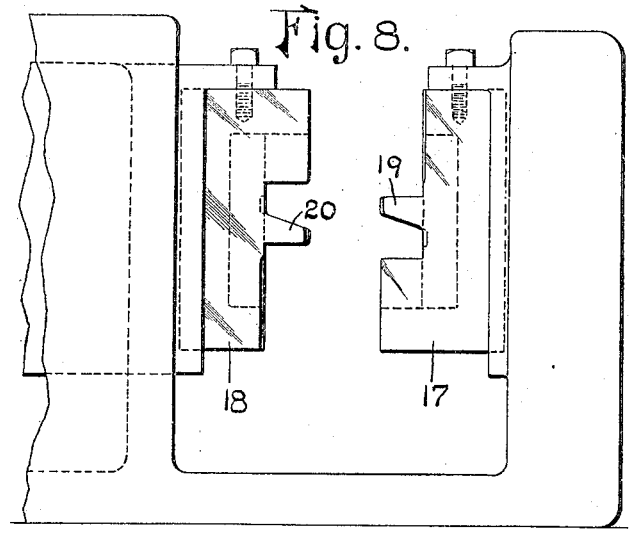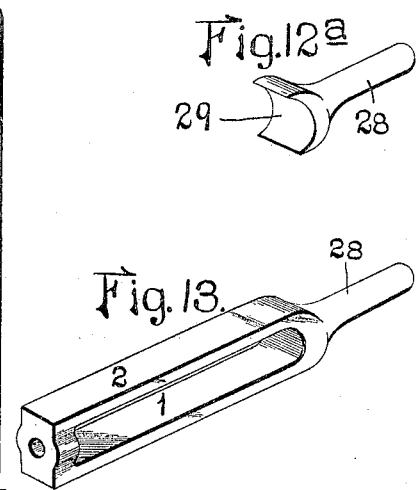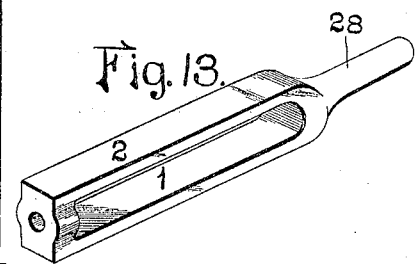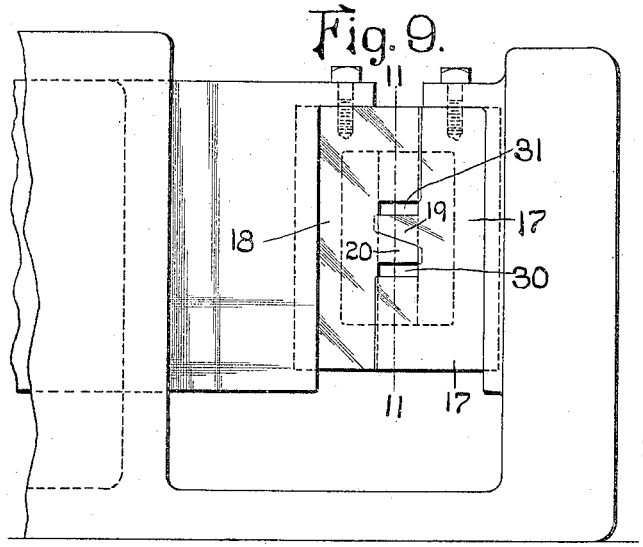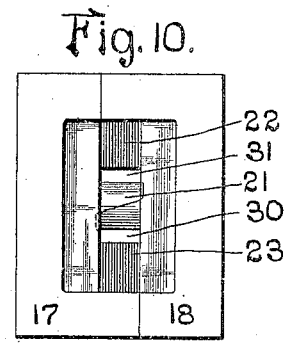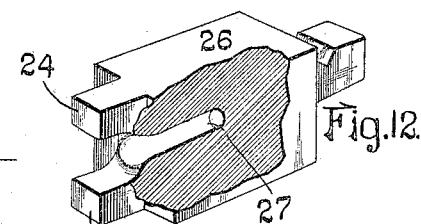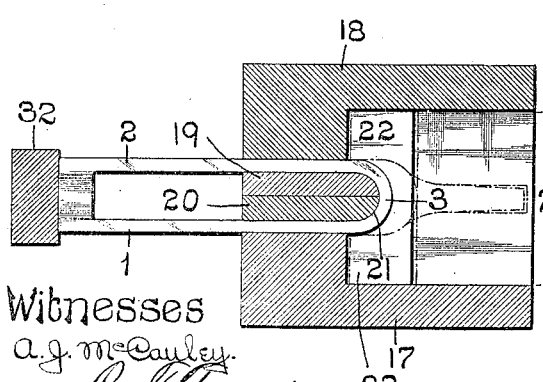

UNITED STATES PATENT OFFICE.

CHARLES REINHART, OF ST. LOUIS, MISSOURI, ASSIGNOR TO THE AMERICAN BRAKE COMPANY, OF ST. LOUIS, MISSOURI, A CORPORATION OF MISSOURI.

FORGING AND WELDING MACHINE.

No. 813,174.  Specification of Letters Patent.  Patented Feb. 20, 1906.

Application filed April 1, 1905. Serial No. 253,324.

*To all whom it may concern:*

Be it known that I, CHARLES REINHART, a citizen of the United States, residing at St. Louis, Missouri, have invented a certain new and useful Improvement in Forging and Welding Machines, of which the following is a full, clear, and exact description, such as will enable others skilled in the art to which it appertains to make and use the same, reference being had to the accompanying drawings, forming part of this specification, in which—

Figure 1 is a front elevational view of a forging-machine embodying dies suitable for carrying out the initial steps in constructing a clevis or yoke for slack-adjusters or for similar purposes, the dies being shown in their open position. Fig. 2 is a similar view, the die being shown in its closed position. Fig. 3 is an end view of a set of members. Fig. 4 is a sectional view on the line 4 4 of Fig. 2. Fig. 5 is a perspective view of the insert and slotted portion of the clevis or yoke, showing their relative positions prior to being welded together. Fig. 6 is a similar view after the parts are welded together. Fig. 7 is an end view of the plunger for upsetting and welding the insert and slotted part. Fig. 8 is a view showing the dies open for welding the stem on the clevis or yoke. Fig. 9 is an end view showing the dies closed. Fig. 10 is a reverse end view of the dies shown in Figs. 8 and 9. Fig. 11 is a sectional view on the line 11 11 of Fig. 9. Fig. 12 is a fragmentary perspective view of the stem-welding plunger. Fig. 12$^a$ is a perspective view of the stem; and Fig. 13 is a perspective view of the finished clevis or yoke.

This invention relates to an arrangement of dies for forging and welding parts together, and particularly such parts as are generally employed in constructing slack-adjusters and used in analogous arts. The element shown in the accompanying drawings as being formed by my improved dies is what might be termed a slack-adjuster "clevis" or "yoke;" but I would have it understood that I reserve the right to form other elements of a similar nature, if desired.

One of the objects of the invention is to provide means whereby the operator will be able to utilize commercial iron of such length as to construct the slack-adjuster part in an economical manner.

Another object is to provide a yoke, clevis, or similar device which will not require milling or machine-working to form the slot or opening.

In carrying out the invention I preferably employ a bar or strip of metal which may consist of ordinary commercial iron or steel, which may be bent approximately U-shaped to form a loop with sides 1 and 2, spaced apart by a bend 3. For slack-adjuster members the bar will preferably be U-shaped; but under certain conditions the bar may be bent in the form of a V or of any similar form. The free ends of the thus-bent strip are spaced apart a sufficient distance to permit of the introduction of an insert therebetween, which insert in the present instance is illustrated as a ring 4. The end of the insert is slightly within the ends of the sides 1 and 2 for a purpose which will hereinafter be made apparent. The insert and the bar are then placed between two half-dies, as 5 and 6, which are provided with angular extensions 7 and 8 on the respective dies for interengagement with oppositely-arranged recesses 9 and 10, each extension 7 and 8 having a semicircular recess 11 and 12, respectively. These extensions 7 and 8 constitute what might properly be termed a "diagonally-split mandrel," and by reference to Figs. 1 to 3, inclusive, it will be observed that the outer edges of the mandrel members are inclined as well as the walls of the recesses 9 and 10, and this construction of die and mandrel affords an efficient compressing action on the parts of the bars when the mandrel members are brought together.

The mandrel members or extensions 7 and 8 are in the form of flat fillers, which may be interposed between the sides 1 and 2 of the bar, so that when the bar is held in position the recesses 11 and 12 coincide with each other to form a seat immediately in front of the opening 13 in the insert, one of the half-dies being stationary, while the other is movable, as is clearly illustrated in Figs. 1 and 2.

Movable by suitable power and at right angles to the movement of the half-dies 5 and 6 is a plunger 14, having a head 15, on one end of which is a restricted portion 16, adapted to be moved through the opening in the filler when the head 15 contacts with the edges of the sides 1 and 2 of the bar, as is illustrated in Fig. 4, and the movement of the plunger will fill in the spaces between the insert and the corners of the ends of the flat bar, so that the product will be in substantially the form illustrated in Fig. 6.

In Fig. 12$^a$ I have illustrated one form of stem which may be applied to the bend 3 of the bar, which stem is designated by the reference-numeral 28 and is provided with an arcuate head 29 to be welded to the bend in the bar. The construction of this stem is the most convenient and desirable for the specific application to the slack-adjusting devices; but various forms of stems may be employed or, in fact, wholly eliminated for certain purposes.

After the device has been formed—as, for example, as illustrated in Fig. 6—it may be operated upon by two half-dies 17 and 18, which half-dies are formed with extensions 19 and 20, comprising a diagonally-split mandrel curved at its inner portion, as at 21, Fig. 10, and cut away to form guides 22 and 23 for the reception of the extensions 24 and 25 of the stem-carrying plunger 26. The plunger 26 is provided with a recess 27 to receive the stem 28, having the arcuate attaching portion 29, heretofore mentioned, which when the plunger is brought into contact with the curve or bend 3 of the bar will weld onto said bar, so that the finished product will be similar to that shown in Fig. 13. When the two half-dies 17 and 18 are brought together, they form slots 30 and 31, through which the sides 1 and 2 project, so that the bar will be held rigid to receive the attached stem. The rearward-sliding movement of the bar will be prevented, or at least limited, by the back-stop 32, against which the bend 3 of the bar may contact during the operation just described.

It is to be understood that the parts are heated to a welding temperature while being joined, and it will be apparent that a strong forged clevis, yoke, or similar device will be produced which will possess the requisite resisting power to which a device of this character will be subjected and that a neat and economical forging will be produced without the necessity of milling or being machine-worked. By arranging the insert slightly in rear of the free ends of the sides of the bar the action of the first plunger will suffice to intimately mix the molecules of the metal in the bar with the molecules of the metal in the insert, so as to make them practically one piece without weakening the device at the point of connection of the bar with the insert. The same is true of the connection of the stem with the body portion of the clevis formed by the bar.

From the foregoing description it will be observed that when the two half-dies 5 and 6 come together a compressive action is exerted on the sides 1 and 2 and the insert in a direction diagonal to the closing movement of the dies. This compressive action will be sufficient to upset the metal when the dies are brought together preparatory to the contact of the plunger 15 with the insert and the ends of the bar. Attention is also directed to the fact that the dies and mandrel projections are arranged so that the diagonal parting of the dies will permit the work to drop from the mandrel projections and will assist in an easy opening of the dies without any tendency of the mandrel projections to bind against each other or against the work. By using the diagonally-split mandrel it is not essential to have the sides so evenly spaced as might be necessary if the diagonal split was eliminated; but by employing the construction shown the mandrel projections and dies allow for a variation in the relative positions of the assembled pieces prior to being inserted into the machine.

Having thus described the invention, what is claimed as new, and desired to be secured by Letters Patent, is—

1. The combination with oppositely-located half-dies, of mandrel projections carried by the said half-dies and out of alinement with each other, said dies when closed having recesses adjacent the mandrel projections whereby openings are left on opposite sides of the mandrel; substantially as described.

2. The combination with oppositely-located half-dies, of a diagonally-split mandrel having two parts, one of which is carried by each half-die and each of which is out of alinement with the other, said die when closed having recesses at the bases of the mandrel parts whereby openings are left on the opposite sides of the mandrel; substantially as described.

In testimony whereof I hereunto affix my signature in the presence of two witnesses this 30th day of March, 1905.

CHARLES REINHART.

Witnesses:
J. E. PARSONS,
GEORGE BAKEWELL.